United States Patent
MaHoney et al.

(10) Patent No.: US 7,371,967 B2
(45) Date of Patent: May 13, 2008

(54) PROTECTIVE CABLE GUIDE AND SEPARATOR ASSEMBLY

(75) Inventors: William G. MaHoney, Suwanee, GA (US); G. Lucius Herrmann, Decatur, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 11/275,476

(22) Filed: Jan. 9, 2006

(65) Prior Publication Data
US 2006/0278427 A1    Dec. 14, 2006

Related U.S. Application Data

(60) Provisional application No. 60/595,172, filed on Jun. 13, 2005.

(51) Int. Cl.
*H01B 7/00*    (2006.01)

(52) U.S. Cl. ............... 174/117 F; 174/117 FF; 174/115; 174/368; 174/113 R; 439/540.1; 439/165; 361/818; 361/680

(58) Field of Classification Search .......... 174/117 FF, 174/115, 117 F, 113 R, 368; 439/540.1, 439/165; 361/818, 680
See application file for complete search history.

(56) References Cited

U.S. PATENT DOCUMENTS

| | | | | |
|---|---|---|---|---|
| 4,149,026 | A | * | 4/1979 | Fritz et al. ................ 174/32 |
| 4,370,700 | A | * | 1/1983 | Duddles et al. ............ 361/818 |
| 5,053,583 | A | * | 10/1991 | Miller et al. .............. 174/36 |
| 5,527,996 | A | * | 6/1996 | Ham ....................... 174/113 R |
| 6,413,103 | B1 | * | 7/2002 | Merz et al. ............... 439/98 |
| 2003/0118179 | A1 | * | 6/2003 | Barnett et al. .......... 379/428.01 |

* cited by examiner

*Primary Examiner*—Jinhee J. Lee

(57) ABSTRACT

A protective cable guide and separator assembly. A first handle is coupled to first ends of a plurality of RF cables and a second end is coupled to second ends of the plurality of RF cables. At least one resilient portion is between the first and second handle portions for receiving and retaining the plurality of RF cables. The resilient portion protects the RF cables and maintains consistent spacing between each RF cable relative one another.

19 Claims, 6 Drawing Sheets

PROTECTIVE CABLE GUIDE AND SEPARATOR ASSEMBLY

CROSS-REFERENCE TO RELATED APPLICATIONS

This application claims priority to U.S. provisional application Ser. No. 60/595,172 filed Jun. 13, 2005, which is incorporated herein by reference.

TECHNICAL FIELD

The present invention relates to controlled cable management within an enclosure such as a CATV node.

BACKGROUND OF THE INVENTION

In enclosures such as CATV nodes, for example Scientific-Atlanta's Gainmaker® or 1 GHz node, cable management is typically difficult as enclosures get smaller and capability expands. In outdoor enclosures this is particularly difficult due to the minimal amount of free space and the fact that the upper and lower housing halves are closed up together and compress the cables inside. A major problem is that cables get trapped or pinched between the two housing halves when the units are opened and closed. The cables become damaged and then the housing does not seal properly. Additionally, when housings are opened and closed, the cables within the housing move around and flex. The location of the cables and their relative spacing to each other and adjacent electronics within the housing can adversely affect system performance. If the spacing is not adequately maintained, cross talk may occur between RF conductors which creates undesirable noise. What is needed is a protective cable guide and separator assembly for protecting cables from damage as well as maintaining the spacing between the cables.

BRIEF DISCRIPTION OF THE DRAWINGS

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

The present invention is a protective cable guide and separator assembly for protecting cables from damage as well as maintaining the spacing between the cables. In one embodiment, the protective cable guide and separator assembly is a flat ribbon style. However, the protective cable guide and separator assembly may be round or have any of a variety of cross-section shapes (oval etc.). The protective cable guide and separator assembly can be manufactured to any practical custom length based on the desired cable lengths.

Figure 1:
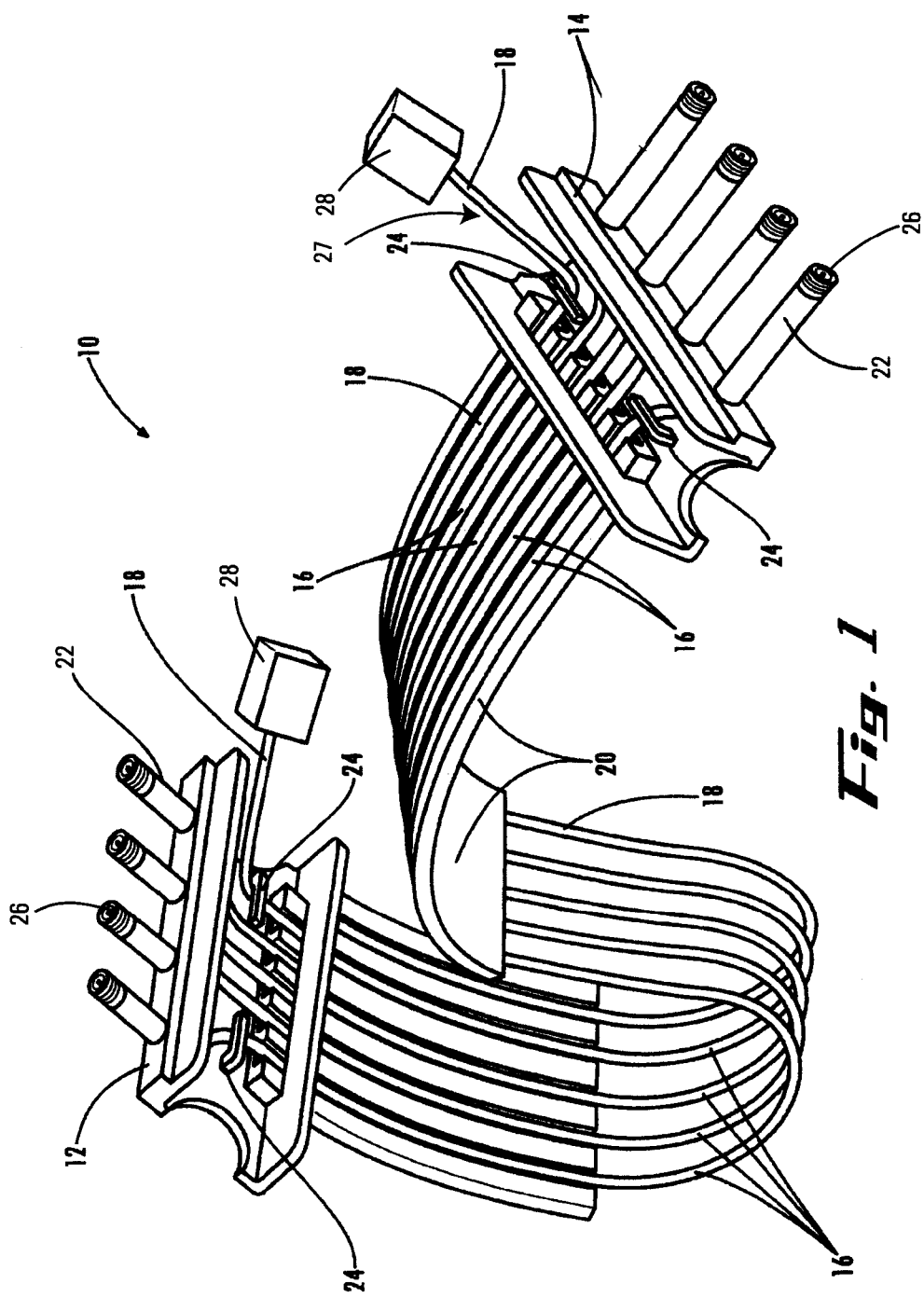
FIG. 1 illustrates a perspective view of a protective cable guide and separator assembly according to on one embodiment of the present invention.

In FIG. 1, the protective cable guide and separator assembly 10 includes handle portions 12 and 14. Preferably, the handle portions 12, 14 are molded and made of plastic or other suitable material. Alternatively, the handle portions may be made of metal or other suitable material for making connections. The handle portions 12, 14 collect a plurality of conductors such as RF cables 16 and power cables 18 with connectors 26, 28, respectively. on their ends that extend between the two handle portions 12, 14. Extensions 22 of the handle portions 12, 14 extend outward so that the connectors 26 are held in a fixed position relative one another. In one embodiment, one of the handle portions 12, 14 connect or plug into an optical interface board housed within a node or enclosure and the other connects or plugs into optical devices such as an amplifier housed within the node or enclosure. Alternatively, the embodiment may be used to connect any "A" electronics to any "B" electronics or "C" etc. The handle portions 12, 14 allow multiple coaxial connections to be made at one time while also providing strain relief for the assembly. The handle portions 12, 14 as well as the lengths of the RF and power cables may be sized based upon the size of the enclosure as well as the size of the mating device. Each of the handle portions may have protruding portions 24, such as an L-shaped portion, for hooking or urging against one or more of the RF and power cables and maintaining them in place with the handle portions. The handle portions 12, 14 may also have open sides 27 to allow for the extension of a power cable 18 from the handle portions 12, 14.

The present invention also includes one or more resilient portions 20 between the handle portions 12, 14. In FIG. 1, there is a resilient portion 20 coupled to handle portion 12 and another resilient portion 20 coupled to handle portion 14. Preferably, the resilient portion is made of extruded silicone or other resilient material such as Ethylene Propylene Diene EPDM which a portion of which is sized to be received and retain within an elongated opening in the top of each handle portion 12, 14. Alternatively, a single resilient portion may extend uninterrupted between the two handle portions 12 and 14.

Figure 3:
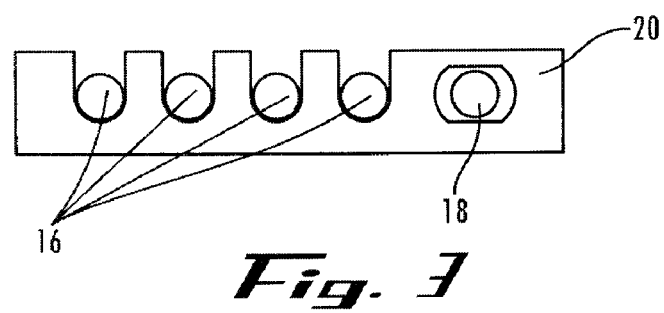
FIG. 3 illustrates a cross-section view of the protective cable guide and separator assembly of FIG. 1.

The resilient portion 20 includes a plurality of discrete channels or openings therethrough along its entire length for receiving and retaining the conductors such as the RF cable and power cables. For example, four coaxial RG179 cables and a 14 conductor power cable may be used within the resilient portion 20. The design therefore protects the cables with the silicone body and maintains a consistent spacing for the individual cables. As shown in FIG. 3, the RF cables are in open-sided channels exposed to the exterior along their length, but the power cable is enclosed within closed-sided channel through the length of the resilient portion.

Figure 2:
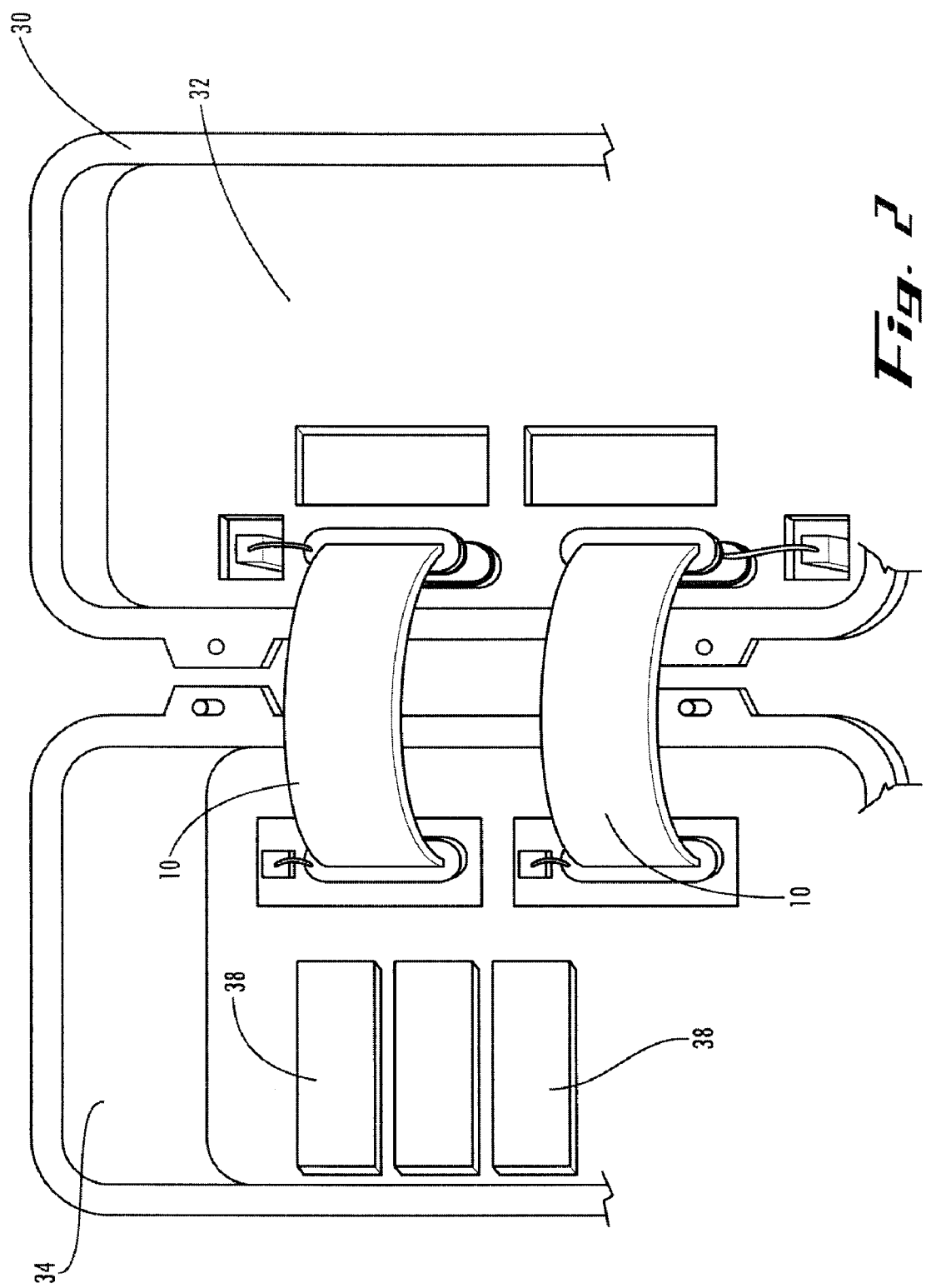
FIG. 2 illustrates a partial perspective view of an open enclosure wherein protective cable guide and separator assemblies extend between one portion of the open enclosure to another.

Also, multiple protective cable guide and separator assemblies 10 may be utilized within an enclosure such as in an optical node having forward and reverse signals as shown in FIG. 2. In some enclosures, such as a 6940 optical node, one half or portion 30 of the enclosure houses the optical interface board under a tiltable panel 32 which has openings therethrough for receiving the handle portions and the connectors of the power cables that are plugged into the optical interface board.

Figure 4:
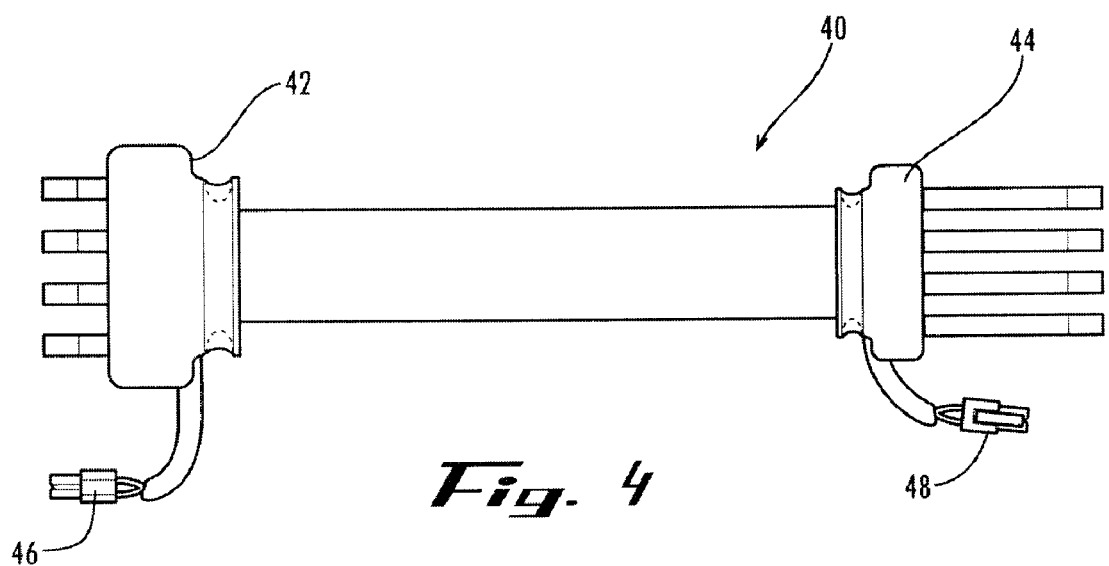
FIG. 4 illustrates a perspective view of a protective cable guide and separator assembly according to an alternative embodiment of the present invention.
Figure 5:
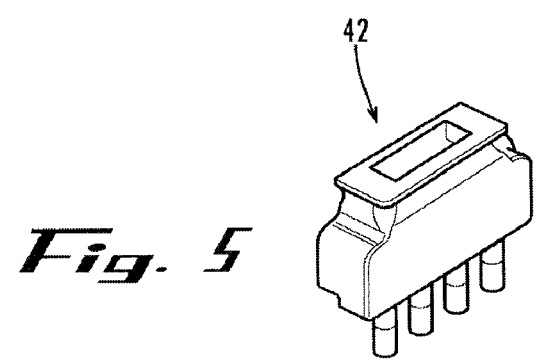
FIG. 5 illustrates a perspective view of a handle portion on one end of the protective cable guide and separator assembly of FIG. 4.
Figure 6:
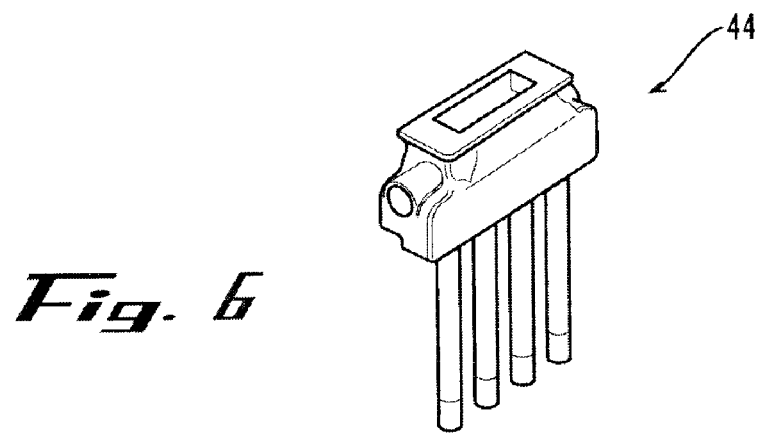
FIG. 6 illustrates a perspective view of another handle portion on the other end of the protective cable guide and separator assembly of FIG. 4.
Figure 7:
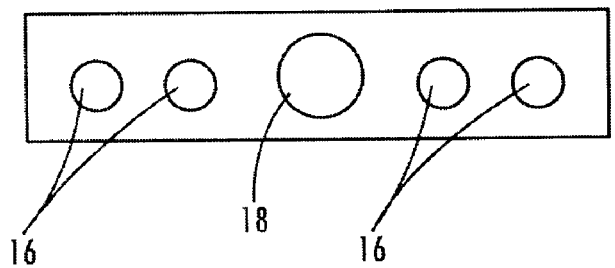
FIG. 7 illustrates a cross-section view of the protective cable guide and separator assembly of FIG. 4.

However, the RF cables may also be enclosed as shown in the alternative embodiment of a protective cable guide and separator assembly 40 as shown in FIG. 4. The protective cable guide and separator assembly 40 includes handle portions 42 and 44 as shown in FIGS. 5 and 6, respectively. Power cable connectors 46 and 48 extend from handle portions 42 and 44, respectively. FIG. 7 illustrates a cross-sectional view of the protective cable guide and separator assembly 40. In this embodiment, the power cable 18 is oriented between the center-most RF cables 16.

Figure 8:
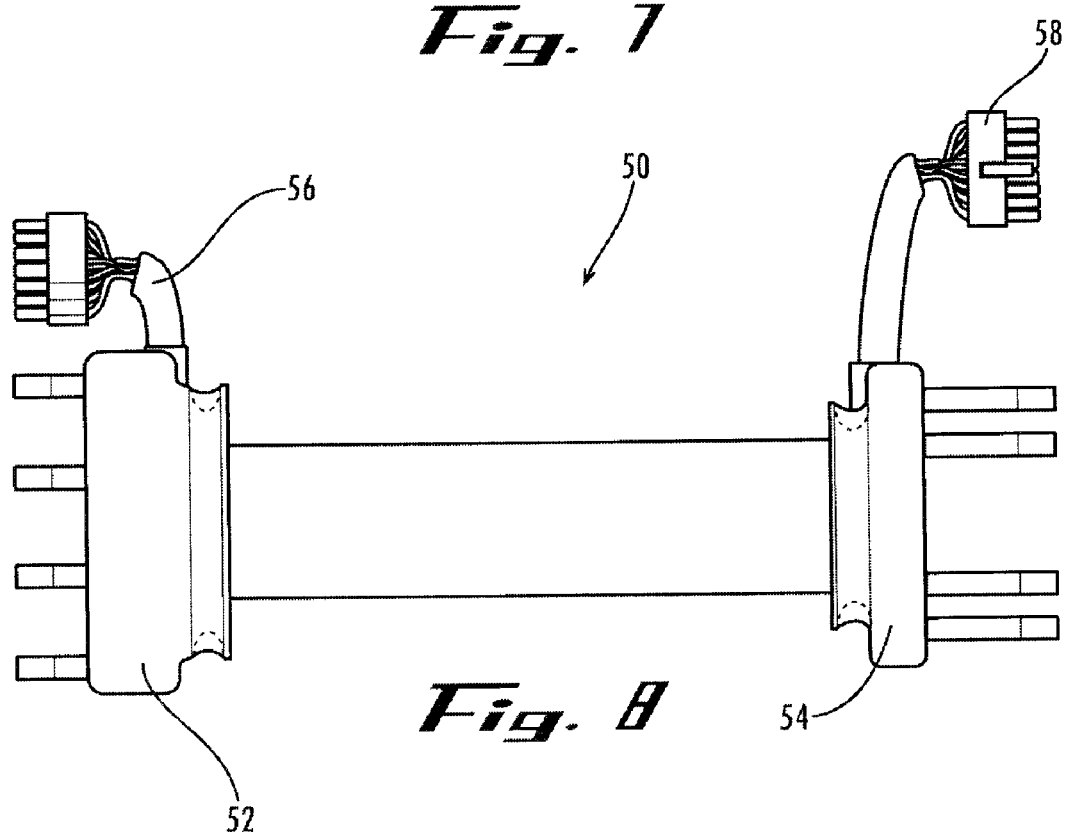
FIG. 8 illustrates a perspective view of a protective cable guide and separator assembly according to another alternative embodiment of the present invention.
Figure 9:
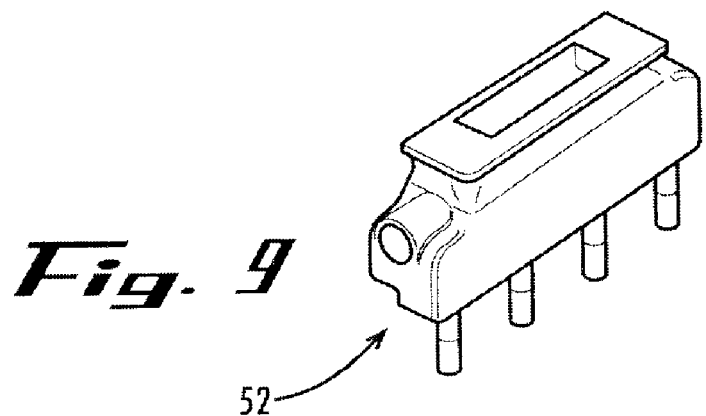
FIG. 9 illustrates a perspective view of a handle portion on one end of the protective cable guide and separator assembly of FIG. 8.
Figure 10:
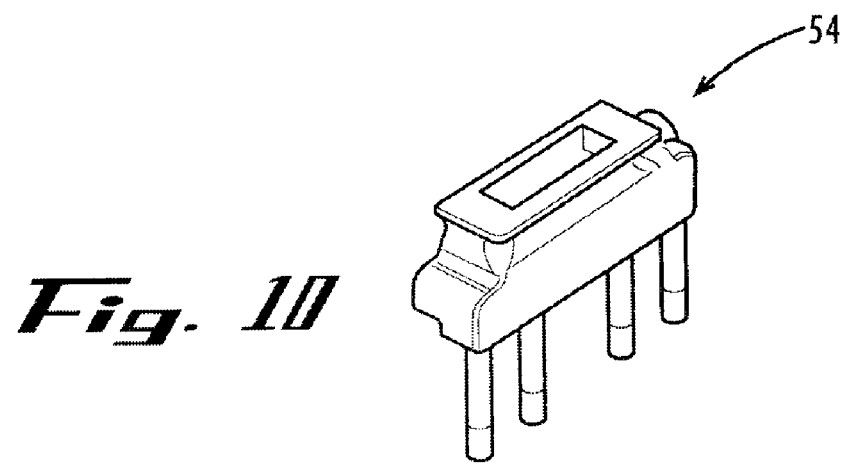
FIG. 10 illustrates a perspective view of another handle portion on the other end of the protective cable guide and separator assembly of FIG. 8.
Figure 11:
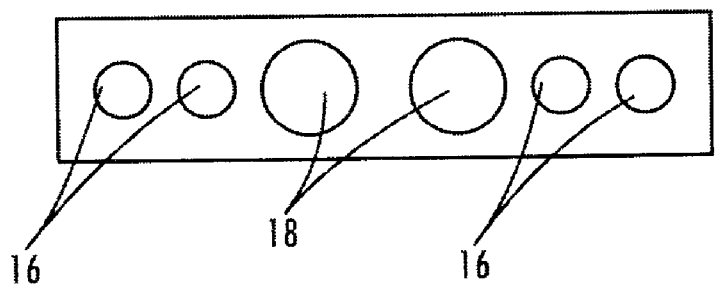
FIG. 11 illustrates a cross-section view of the protective cable guide and separator assembly of FIG. 8.

The RF cables may also be enclosed as shown in the alternative embodiment of a protective cable guide and separator assembly 50 as shown in FIG. 8. The protective cable guide and separator assembly 50 includes handle portions 52 and 54 as shown in FIGS. 9 and 10, respectively. Power cable connectors 56 and 58 extend from handle portions 52 and 54, respectively. FIG. 11 illustrates a cross-sectional view of the protective cable guide and separator assembly 50. In this embodiment, two power cables 18 are oriented between the center-most RF cables. For this design there is a 14 conductor power cable for DC power and control signals and a separate 4 conductor power cable for AC power. This design could accommodate any number of types of cables. Preferably, the protective cable guide and separator assemblies 40 and 50 are configured somewhat differently in order to distinguish between forward and reverse signals within an optical node. For example, the connectors of the cables could be spaced differently relative one another or relative the connectors on a handle portion of an other protective cable guide and separator.

Figure 12:
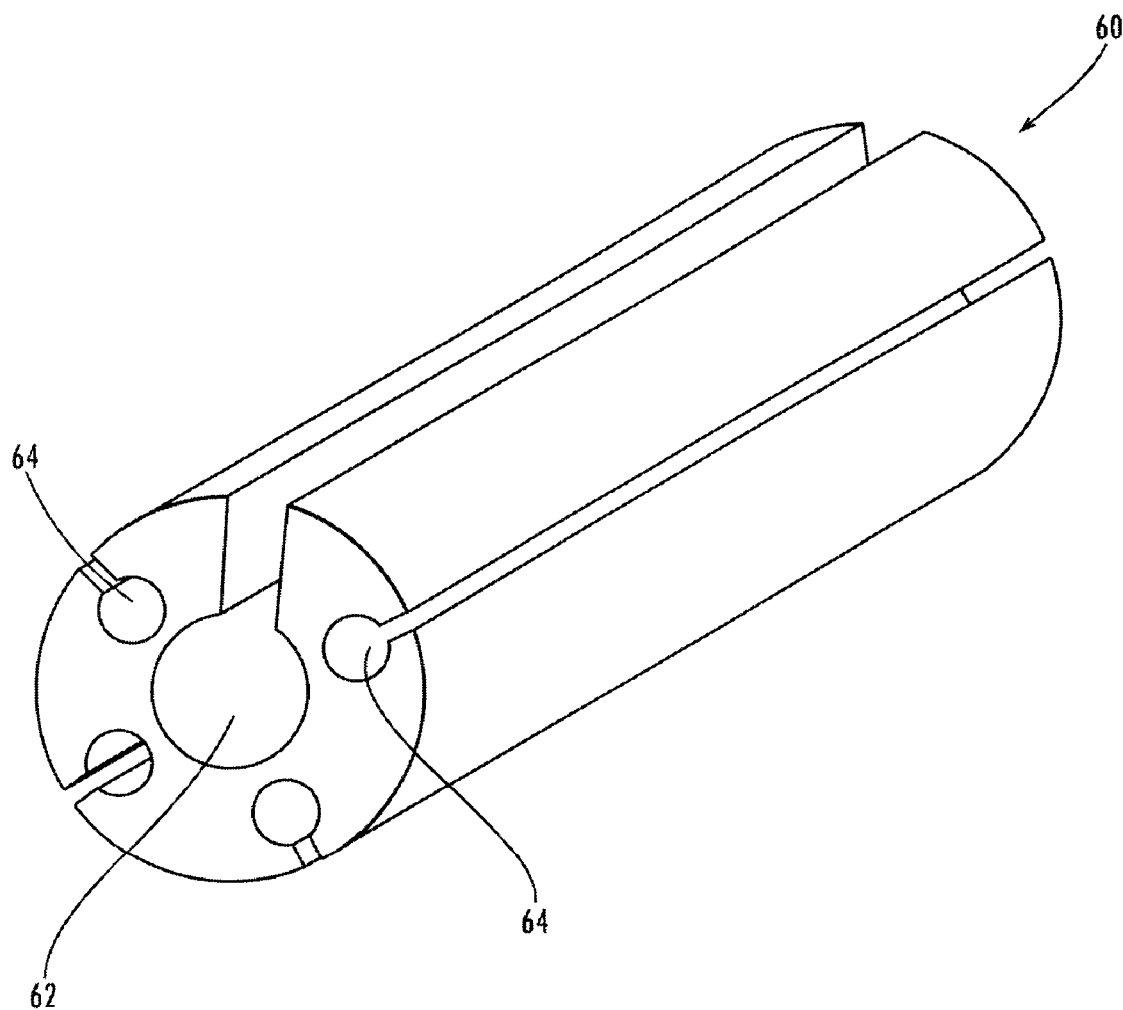
FIG. 12 illustrates a perspective view of a cylindrical cable management portion according to another alternative embodiment of the present invention.

FIG. 12 illustrates an alternative embodiment of a resilient portion 60 which may be utilized in the present invention. The resilient portion 60 is circular and has a concentric opening 62 extending through its entire exterior length. The concentric opening 62 is accessible along its length from the exterior of the resilient portion 60 and is for receiving and retaining one or more cables such as a power cable. The resilient portion 60 also includes radially oriented discrete openings 64 extending through its entire exterior length. The radially oriented openings 64 are for receiving cables such as RF cables and are also accessible along their length from the exterior of the resilient portion 60. When all cables are installed and fill the openings 62, 64 radial forces are created against each cable to secure them in place. The forces are created when the coaxial cables fill their respective channel the resilient portion expands. When the round guide twists it does tend to close up the openings on each coaxial cable channel.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the cope of the invention defined by the claims.

What is claimed is:

1. A protective cable guide and separator assembly comprising:
   a plurality of radio frequency (RF) cables have a first end and a second end, said RF cables having RF connectors at said first and said second end;
   a first handle portion coupled to said first end of said plurality of RF cables;
   a second handle portion coupled to said second end of said plurality of RF cables; and
   at least one resilient portion between said first and second handle portions for receiving and retaining said plurality of RF cables, said at least one resilient portion for protecting said plurality of RF cables and for maintaining consistent spacing between each said RF cable relative to one another; and spaced-apart extensions extending outwardly from said first handle portion to receive said first end of said RF cables and hold said RF connectors in a spaced-apart position to allow each said RF connectors of said first end of said plurality of RF cables to be connected substantially simultaneously.

2. The protective cable guide and separator assembly of claim 1 further comprising spaced-apart extensions extending outwardly from said second handle to receive said second end of said RF cables and hold said RF connectors in a spaced-apart position to allow each said RF connectors of said second end of said plurality of RF cables to be connected substantially simultaneously.

3. The protective cable guide and separator assembly of claim 1 wherein said resilient portion extends along substantially the entire length of said plurality of RF cables between said first and second handle portions.

4. The protective cable guide and separator assembly of claim 1 wherein said resilient portion includes a plurality of open-sided channels, each said channel for receiving and retaining each RF cable of said plurality of RF cables.

5. The protective guide and separator assembly of claim 1 further comprising a power cable received and retained in said resilient portion.

6. The protective cable guide and separator assembly of claim 1 wherein said first handle portion is coupled in a first portion of an open enclosure and said second handle portion is coupled in a second portion of said open enclosure.

7. The protective cable guide and separator assembly of claim 1 wherein said at least one resilient portion is round.

8. The protective cable guide and separator assembly of claim 7 wherein said round resilient portion includes a plurality of radially-oriented openings extending along its length, each said opening accessible along the exterior length of said resilient portion and for receiving and retaining each RF cable of said plurality of RF cables therein.

9. The protective cable guide and separator assembly of claim 8 wherein radial forces are created against each said RF cable when said F cables are installed in said openings in order to secure said RF cable in said openings.

10. The protective cable guide and separator assembly of claim 8 wherein twisting said round resilient portion closes up at least one of said opening along a portion of said at least one opening.

11. The protective cable guide and separator assembly of claim 8 wherein said openings of said resilient portion are spaced equidistant apart.

12. The protective cable guide and separator assembly of claim 7 wherein said resilient portion includes a concentric opening extending through its entire length which is accessible along the exterior length of said resilient portion.

13. The protective cable guide and separator assembly of claim 1 in combination with a second protective cable guide and separator assembly, said second protective cable guide and separator assembly also comprising:
    a plurality of RF cables have a first end and a second end;
    a first handle portion coupled to said first end of said plurality of RF cables;
    a second handle portion coupled to said second end of said plurality of RF cables; and
    at least one resilient portion between said first and second handle portions for receiving and retaining said plurality of RF cables, said at least one resilient portion for protecting said plurality of RF cables and for maintaining consistent spacing between each said RF cable relative one another,
    wherein said plurality of RF cables of said first protective cable guide and separator assembly are spaced differently relative one another than are said plurality of RF cable of said protective cable guide and separator assembly are spaced relative one another.

14. The protective cable guide and separator assembly of claim 12 wherein said plurality of RF cables of said first protective cable guide and separator assembly are spaced differently relative one another than are said plurality of RF cable of said second protective cable guide and separator assembly are spaced relative one another in order to distinguish between forward and reverse signals.

15. The protective cable guide and separator assembly of claim 12 wherein said first and second handle portions of said first protective cable guide and separator assembly are configured differently from said first and second handle portions of said second protective cable guide and separator assembly in order to distinguish between forward and reverse signals.

16. A protective cable guide and separator assembly comprising:
    a plurality of radio frequency (RF) cables having a RF connector at a first end and a second end;
    a first handle portion coupled to said first end of said plurality of RF cables;
    a plurality of extensions extending outward from said first handle to receive said first end of said RF cables and hold said RF connectors of said first end in a fixed position relative to one another;
    a second handle portion coupled to said second end of said plurality of RF cables; and
    at least one resilient portion between said first and second handle portions for receiving and retaining said plurality of RF cables, said at least one resilient portion for protecting said plurality of RF cables and for maintaining consistent spacing between each said RF cable relative to one another.

17. A protective cable guide and separator assembly comprising:
    a plurality of radio frequency (RF) cables having a RF connector at a first end and a second end;
    a first handle portion coupled to said first end of said plurality of RF cables;
    a second handle portion coupled to said second end of said plurality of RF cables; and
    at least one resilient portion between said first and second handle portions for receiving and retaining said plurality of RF cables, said at least one resilient portion for protecting said plurality of RF cables and for maintaining consistent spacing between each said RF cable relative to one another, said resilient portion having a plurality of open-sided channels for receiving and retaining said RF cable therethrough; and spaced-apart extensions extending outwardly from said first handle portion to receive said first end of said RF cables and hold said RF connectors in a spaced-apart position to allow each said RF connectors of said first end of said plurality of RF cables to be connected substantially simultaneously.

18. The protective cable guide and separator assembly of claim 17 wherein said at least one resilient portion further comprises a closed-sided channel for receiving a power cable therethrough.

19. The protective cable guide and separator assembly of claim 18 wherein said first handle portion has an open side through which said power cable received within said closed sided channel may extend.

* * * * *